June 19, 1934.  W. M. HUSTON  1,963,408
DETACHABLE EXTENSION FOR TRACTOR TRUCKS
Filed Sept. 13, 1933   3 Sheets-Sheet 1

Witness:
Chas. R. Konish

Inventor
William M. Huston
Offield Nehlhope Scott Poole
Attys

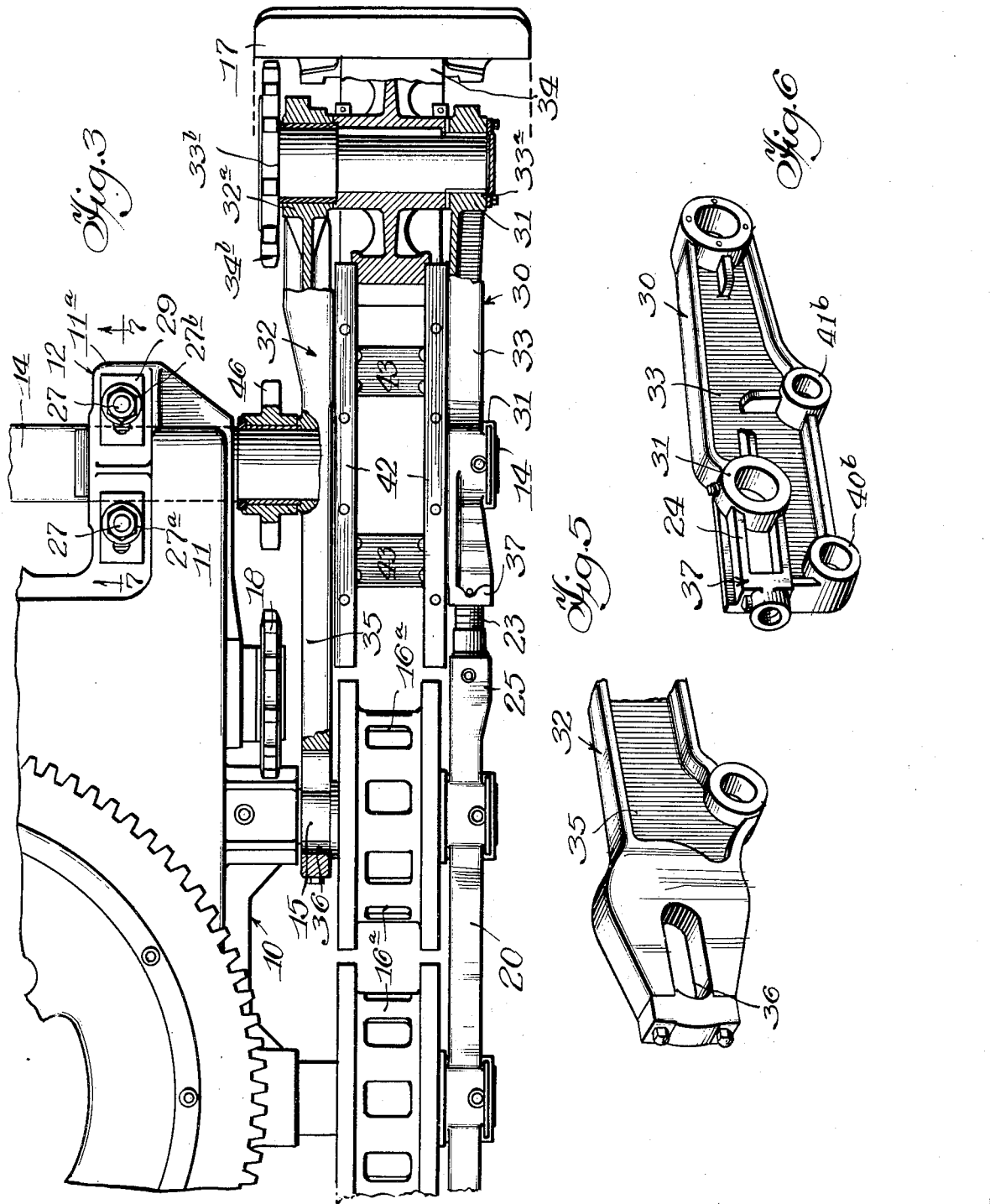

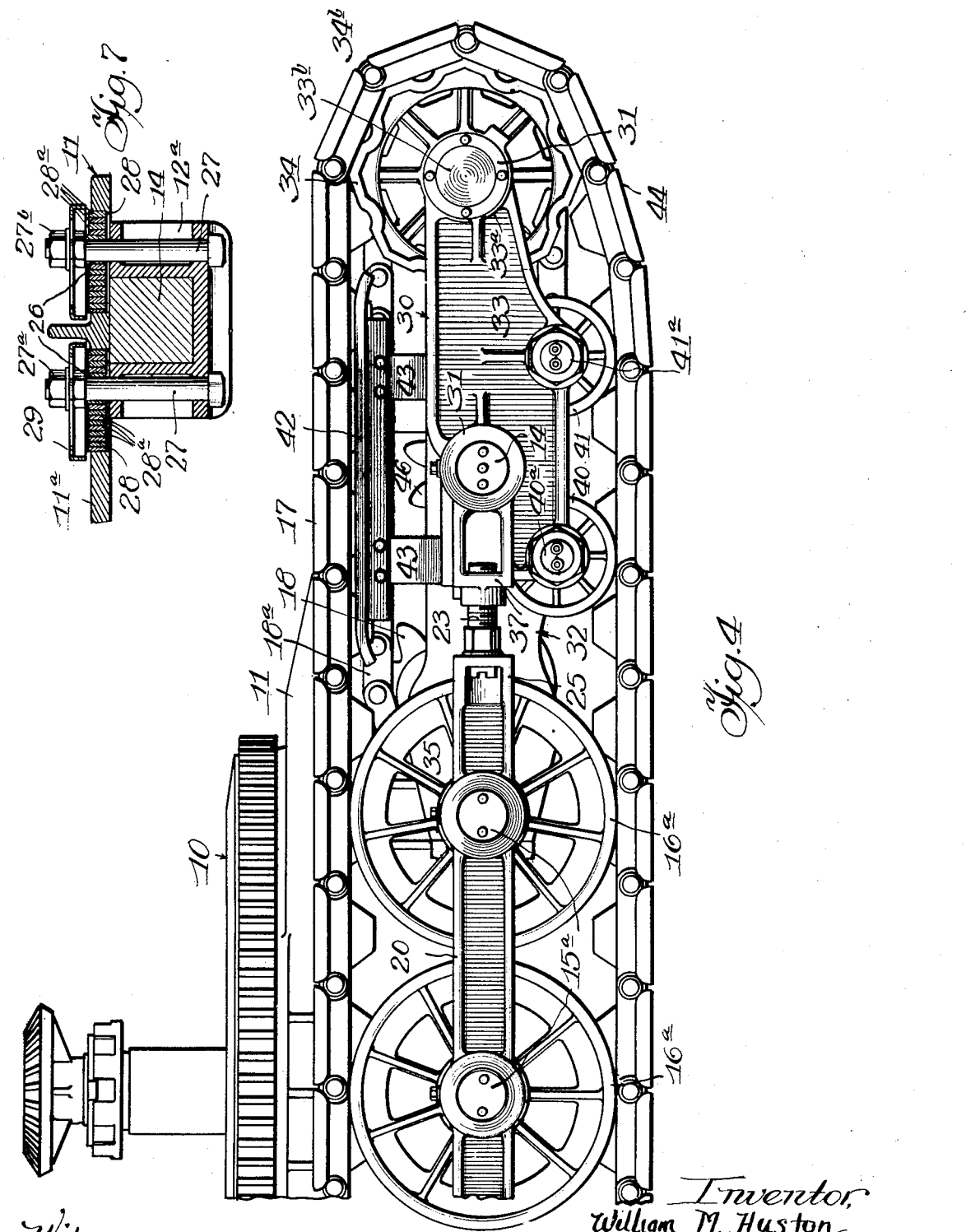

Patented June 19, 1934

1,963,408

UNITED STATES PATENT OFFICE 1,963,408

DETACHABLE EXTENSION FOR TRACTOR TRUCKS

William M. Huston, Lima, Ohio, assignor to The Ohio Power Shovel Company, Lima, Ohio, a corporation of Ohio Application September 13, 1933, Serial No. 689,195

6 Claims. (Cl. 305—8)

This invention relates to improvements in extension attachments for endless tread tractors, and has for its principal object to provide a simple and efficient device of the character described which is capable of being readily applied with minimum labor and mechanical skill.

Endless tread tractors of the type extensively used to support power shovels, excavators, cranes or like machines are usually designed to afford a fairly standardized ratio of weight and effective tread supporting area to give the proper traction support on the average types of ground over which the machines are to be used. In some localities, however, softer types of soil, muck or the like are encountered, that require treads of substantially greater supporting area.

In carrying out my invention, I provide an extension device to be applied to treads of standard length so as to quickly and readily extend the supports for the treads at one or both ends of the tractor, whereby the tread supporting area may be lengthened by increasing the number of links thereof. The attachment is particularly designed so as to be easily attached or detached in the field as occasion demands.

The invention may best be understood by reference to the accompanying drawings, in which Figure 1 is a fragmentary plan view of a tractor frame of standard length tread construction, showing one corner thereof before the tread extension attachment is applied.

Figure 3 is a plan view of the tractor frame shown in Fig. 1, but in which the extension attachment has been applied thereto.

Figure 4 is a side view similar to Fig. 2, but with the extension attachment applied.

Figure 5 is a detail perspective view of the anchor arm forming a part of the extension attachment.

Figure 6 is a detail perspective view of the outer plate forming another part of the extension attachment.

Figure 7 is a detail section, taken on line 7—7 of Fig. 3, showing part of the adjusting device for the end axle.

Figure 1:
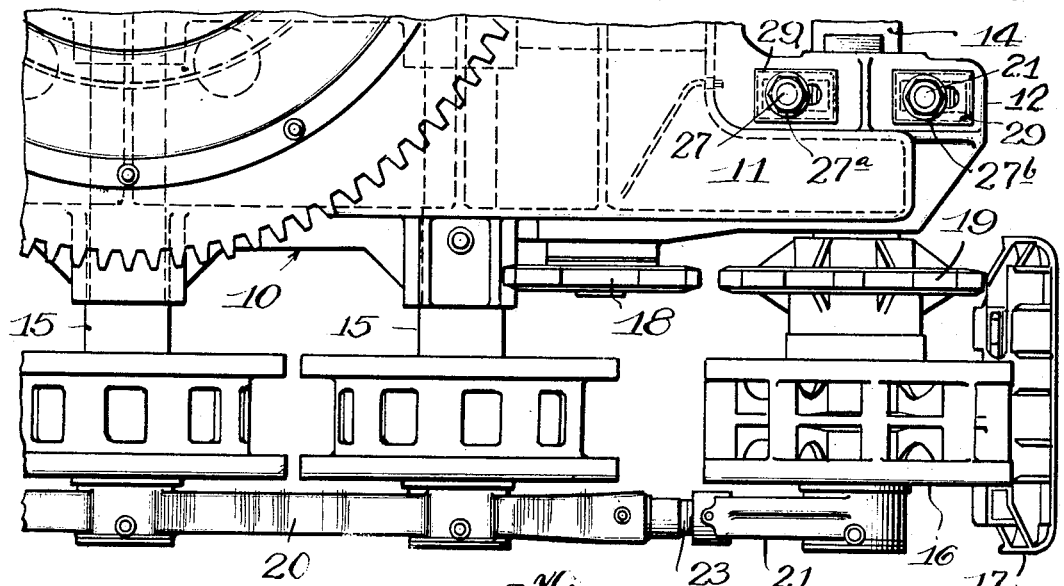

Referring now to details of construction of the embodiment of my invention illustrated in the drawings, an endless tread tractor truck of standard length and construction will first be described. As shown in Fig. 1, said truck includes a main frame 10, adapted to support a superstructure such as a power shovel, excavator, crane or the like, which superstructure has been omitted from the drawings as it is immaterial to the present invention. Since the extension attachments for all four corners of the main frame are substantially alike, excepting that the drive for the tread may be connected to the tread supporting wheels at one end only, the drawings illustrate but a fragmentary portion of the tread structure including one corner of the truck at the driving end thereof. It will be understood that the extension devices at the other four corners may be substantially similar excepting that the driving connections would be omitted at the opposite or undriven ends of the treads.

Figure 2:
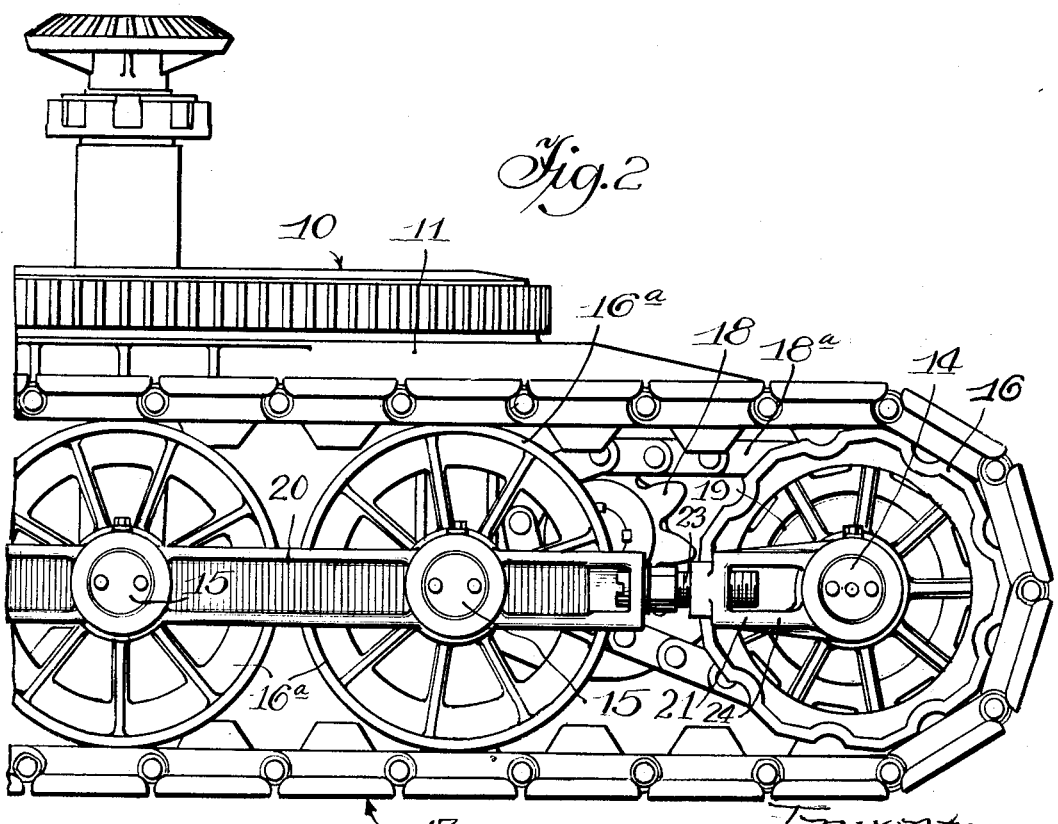
Figure 2 is a side view of the standard length tread tractor shown in Fig. 1.

The main frame includes a pair of similar longitudinal side frame members or beams 11, of which one is shown in Figs. 1 and 2. A journal bracket 12ᵃ provides bearing for each of the ends of the end axle 14 which has tread-supporting wheel 16 thereon. Said journal brackets are adjustably mounted with respect to the side frame members 11 as indicated in Fig. 7, details of which construction will hereinafter more fully appear.

One or more intermediate tread supporting wheels 16ᵃ, 16ᵃ are also suitably supported on stub axles 15, 15 along the sides of the truck.

The tread links of the endless tread indicated generally at 17 are trained over and under the end wheel 16 and intermediate wheels 16ᵃ. The tread is driven in any suitable manner, in the form shown the drive being provided through a drive sprocket 18, a drive chain 18ᵃ, and sprocket 19 on the wheel 16. The tread supporting wheels 16 and 16ᵃ on axles 14 and 15 are disposed on the outer side of the side frame member 11. The outer ends of said axles are journalled in a horizontal side bar 20 extending along the outer sides of the wheels at each side of the truck. This side bar construction, in so far as it is used in a tread of standard length, is similar to that disclosed and claimed in the patent to John D. Rauch No. 1,906,415 issued May 2, 1933.

The end axle 14 is provided with longitudinal adjusting means which at the driven end of the truck affords take-up for the drive chain 18ᵃ as well as the tread 17. It will be understood, of course, that at the opposite or undriven end of the truck a similar adjustment is provided which affords an independent take-up for the tread.

The side bar 20 is provided with an end bearing piece 21 forming the journal for the end axle 14. This end piece is rigidly connected to the main part 20 of the side bar by a longitudinal adjusting device, herein consisting of the screw member 23, threaded in yoke 24 of the end piece 21, and having a head rotatably mounted in yoke 25 of the main part of the side bar.

The adjacent journal bracket 12ᵃ for the end axle 14 is supported beneath the side frame member 11 and is adjustable lengthwise thereof, as illustrated in Fig. 7. Said bracket is provided with a pair of upright bolts 27, 27 extending upwardly through longitudinal slots 28, 28 formed in the horizontal flange 11ᵃ of said side frame 11 against which the upper surfaces of the bracket and axle are engaged. Each of said bolts passes through a block 26 fitting transversely in the slot 28. A plurality of shims 28ᵃ are also fitted transversely in each of the slots 28 so as to fill said slots forwardly and rearwardly of the blocks 26, as shown. Said shims, however, are removable so that they may be transferred from in front to rear of the bolts, or vice versa, as required to maintain said bolts in various adjusted positions.

In the preferred form shown, a cover plate 29 is fixed on the end of each bolt 27 between lock nuts 27ᵃ and 27ᵇ. This construction prevents accidental removal of the shims except when the upper lock nut 27ᵇ is removed.

The method of adjustment of end axle 14 is as follows: The cover plates 29 are removed from bolts 27, 27, and the necessary number of shims is removed from slots 28, 28 to permit adjustment in the desired direction. The screw member 23 of the side frame 20 is then manipulated so as to shift the end axle positively to the desired position. The shims are then changed to the proper position in slots 28, and the cover plates 29 replaced.

It will be understood that the standard length tread construction above described is such as may be made at the factory and is designed for average operating conditions. When it is desired to provide additional supporting area for the treads, a pair of extension attachments is provided at one or both ends of the treads, as will now be described.

Each pair of extension attachments, of which one attachment is shown in Figs. 3 and 4, comprises similar extension brackets 30. Said brackets are designed to replace the tread-supporting wheels 16 at each end of the end axle.

It should be here explained that it is usually undesirable to extend the tread to such an unwieldy length as to accommodate a full size idler wheel similar to the wheels 16ᵃ carried on the intermediate axles 15. Accordingly, the use of each pair of extension attachments 30 contemplates that the tread supporting wheels 16 will be removed from the end axle 14, but that said axle will remain in its customary place, and will be utilized as a part of the support for said extension attachment, as will now be described.

Each of said extension attachments 30 comprises a rigid frame having a journal 31 fitting over the projecting end of the end axle 14. Rigid with said journal are inner and outer frame members 32 and 33 which are connected together by inverted U-shaped pieces 43, 43, and provided at their outer ends with journal bearings 32ᵃ, 33ᵃ for a stub axle 33ᵇ carrying a tread supporting wheel 34 between the spaced frame members, as clearly seen in Fig. 3.

The inner frame member 32 has an arm 35 extending forwardly so as to be detachably anchored to a part rigid with the main frame as herein shown, the next adjacent intermediate stub axle 15 being utilized for this purpose. The end of said anchoring arm is preferably slotted horizontally at 36, so as to afford longitudinal adjustment of the extension frame relative to the main frame.

In the form shown in Figs. 4 and 5, the side bar 20 is adjustably connected to a part 37 corresponding to the end piece 21 used with said side bar when the extension attachment is not in use, as in Figs. 1 and 2. Said part 37 may, if desired, be separate from the extension frame, in which case it would be identical with the end piece 21, and be attached to the end of the end shaft 14 just outside of said frame. In other words, the end piece 21 can be used in connection with the extension frame, if desired, but in the preferred form shown in detail in Fig. 6, said end piece 21 is replaced by the part 37 which is similar thereto, excepting that the latter is made integral with the extension frame 30 and is handled as a unit therewith.

The extension frame 30 is also provided with suitable bearing supports for the portions of the tread between the end wheel 34 and the adjacent tread supporting wheel 16, herein the lower bearing supports comprising two relatively small wheels 40 and 41 on stub axles 40ᵃ and 41ᵃ having their opposite ends mounted in bearings 40ᵇ and 41ᵇ adjacent the lower edges of the side frame members 32 and 33, as shown in Figs. 5 and 6. The upper bearing supports comprise a pair of elongated guide plates 42, 42 suitably supported on the frame 30 as by the inverted U-shaped pieces 43, 43.

The end wheel 34 is preferably somewhat smaller than the tread supporting wheels 16, and its axis is elevated with relation to the axes of the other tread supporting wheels, so as to produce an upward inclined portion 44 of the tread between the said end wheel and the adjacent small wheel 41. This arrangement is often desirable to assist in climbing out of depressions and in maneuvering over soft ground.

When the end wheel 34 forms the drive, as shown, the drive chain is lengthened, so as to engage sprocket 34ᵇ fixed on the inner end of stub shaft 33ᵇ, as clearly shown in Fig. 3. The drive sprocket 19 for supporting wheel 16 is preferably removed with its wheel from the end shaft 14, and is replaced by a smaller idler sprocket 46 for the extended drive chain.

As will now be understood by comparison of Figs. 1 and 3, the length of the treads is increased by applying a pair of extension attachments at each end of axle 14, in the following manner:

After the tread links have been disconnected, the side bar 20 is removed, and the tread supporting wheels 16 and 16ᵃ are removed from the ends of axle 14 and the adjacent intermediate axle 15. The extension attachment is then applied, preferably as a unit, by passing the slotted end of arm 32 over the adjacent intermediate axle 15 and the bearing 31 over the end of axle 14. The intermediate supporting wheel 16ᵃ and the side bar 20 (with end piece 21 removed) are then replaced in their usual positions, and said side bar is connected to part 37 by screw 23 in proper adjusted position.

The proper number of shims 28ᵃ associated with the means for adjusting the axle bearings 12ᵃ should be removed during this adjustment, since it will be observed that the extension frame 30 is now shiftable bodily with the axle 14 during longitudinal adjustment of the latter.

Thus it will be observed that the standard length axle adjusting means also provides an adjustable support for the extension attachment relative to the main frame. In other words, the identical tread or chain tension adjusting means can be used for either standard or extended treads.

As before suggested, similar extension attachments can be used on the opposite end axle, in the same manner as above described, excepting that the drive connections are omitted.

Although I have illustrated and described one particular embodiment of my invention, it will be understood that I do not wish to be limited to the construction shown and described, except as hereinafter claimed, and that various changes and modifications may be made without departing from the spirit and scope of my invention as defined in the appended claims.

1. In an endless tread tractor, a main frame, a transverse end axle adapted to have tread supporting wheels detachably mounted thereon, detachable extension attachments each comprising a bracket having apertured bearings to adapt said bracket to be mounted on one end of said end axle after its respective tread-supporting wheel has been removed, said bracket having extended tread-supporting means at its outer end, and an arm extending from its inner end and rigid therewith adapted to have cooperative detachable engagement with a part of said main frame to resist rotation of said bracket about said end axle.

2. In an endless tread tractor, a main frame, a transverse end axle adapted to have tread-supporting wheels detachably mounted thereon, intermediate axles with tread-supporting wheels thereon, detachable extension attachments each comprising a bracket having an apertured bearing to adapt said bracket to be mounted on one end of said end axle after its respective tread-supporting wheel has been removed, said frame having extended tread-supporting means at its outer end, and an arm rigid with said bracket adapted to have detachable engagement with the adjacent intermediate axle to resist rotation of said bracket about said end axle.

3. In an endless tread tractor, a main frame, a transverse end axle adapted to have tread-supporting wheels detachably mounted thereon, detachable extension attachments each comprising a bracket having an apertured bearing to adapt said bracket to be mounted on one end of said end axle after its respective tread-supporting wheel has been removed, and an arm rigid with said bracket and extending inwardly therefrom and adapted to have detachable engagement with a part rigid with said main frame to resist rotation of said extension bracket on said end axle, and means for adjusting said end axle longitudinally relative to said main frame, said means being effective also to adjust the positions of the extension brackets when the latter are applied to said end axle.

4. In an endless tread tractor, a main frame, a transverse end axle adapted to have tread-supporting wheels detachably mounted thereon, intermediate axles with tread-supporting wheels thereon, detachable extension attachments each comprising a bracket having apertured bearing to adapt said bracket to be mounted on one end of said end axle after its respective tread-supporting wheel has been removed, said bracket having extended tread-supporting means thereon in horizontally spaced relation to said apertured bearing, and an arm rigid with said bracket and adapted to have detachable engagement with the adjacent intermediate axle to resist rotation of said extension bracket axially of said end axle, and means for adjusting said end axle longitudinally relative to said main frame, said means being also effective to adjust the position of the extension brackets when the latter are applied to said end axles.

5. In an endless tread tractor, a main frame, a transverse end axle having tread-supporting wheels, means for securing said end axle in longitudinally adjustable positions relative to said main frame, intermediate axles having tread-supporting wheels engaging the upper and lower flights of an endless tread, a pair of side bars independent of said main frame connecting the outer ends of said intermediate axles at the outside of said supporting wheels, each of said side bars including longitudinal adjusting means between said adjustable end axle and the adjacent intermediate axle, and detachable extension attachments each comprising a bracket having an apertured bearing to adapt said bracket to be mounted on one end of said adjustable axle after its respective supporting wheels have been removed, said bracket having an arm rigid therewith adapted to extend horizontally into engagement with the adjacent intermediate axle, said side bar also having adjustable connection with said bracket when the latter is applied to the end axle.

6. In an endless tread tractor, a main frame, a transverse end axle having tread-supporting wheels, means for securing said end axle in longitudinally adjustable positions relative to said main frame, intermediate axles having tread-supporting wheels engaging the upper and lower flights of an endless tread, a pair of side bars independent of said main frame connecting the outer ends of said intermediate axles at the outside of said supporting wheels, each of said side bars including longitudinal adjusting means between said adjustable end axle and the adjacent intermediate axle, and detachable extension attachments each comprising a bracket having an apertured bearing to adapt said bracket to be mounted on one end of said adjustable axle after its respective supporting wheels have been removed, said bracket having an arm rigid therewith adapted to extend horizontally into engagement with the adjacent intermediate axle between its supporting wheel and said main frame, said side bar also having adjustable connection with said bracket when the latter is applied to the end axle.

WILLIAM M. HUSTON.